United States Patent
Fujikawa et al.

(12) 
(10) Patent No.: US 6,513,837 B2
(45) Date of Patent: Feb. 4, 2003

(54) DEVICE FOR COUPLING PIPELINES FOR RUNNING CRYOGENIC LIQUID

(75) Inventors: Hiroshi Fujikawa, Toride (JP); Hiroshi Nishio, Tokyo (JP); Koichi Mori, Soka (JP)

(73) Assignees: Ishikawajima-Harima Heavy Industries Co., Ltd., Tokyo (JP); Ishikawajima System Technology Co., Ltd., Tokyo (JP)

( * ) Notice: Subject to any disclaimer, the term of this patent is extended or adjusted under 35 U.S.C. 154(b) by 0 days.

(21) Appl. No.: 09/876,467

(22) Filed: Jun. 7, 2001

(65) Prior Publication Data
US 2001/0054818 A1 Dec. 27, 2001

(30) Foreign Application Priority Data
Jun. 23, 2000 (JP) ........................................ 2000-194929

(51) Int. Cl.$^7$ ................................................ F16L 55/00
(52) U.S. Cl. .......................... 285/18; 285/901; 285/904
(58) Field of Search ............................. 285/18, 24, 27, 285/901, 904, 920

(56) References Cited

U.S. PATENT DOCUMENTS

| | | | | |
|---|---|---|---|---|
| 4,011,732 A | * | 3/1977 | Doherty et al. ................. | 62/55 |
| 4,462,223 A | * | 7/1984 | Perkins ......................... | 285/41 |
| 4,881,850 A | * | 11/1989 | Abreo, Jr. ..................... | 285/84 |
| 5,071,140 A | * | 12/1991 | Quevedo del Rio ........ | 285/901 |
| 5,433,274 A | * | 7/1995 | Graff et al. ................... | 285/18 |
| 5,699,822 A | * | 12/1997 | Bodhaine ...................... | 285/77 |
| 5,718,265 A | * | 2/1998 | Elsdon et al. ................ | 285/901 |
| 6,106,024 A | * | 8/2000 | Herman et al. ................ | 285/18 |
| 6,134,893 A | * | 10/2000 | Bonn ......................... | 285/904 |

FOREIGN PATENT DOCUMENTS

JP 64-40786 2/1989

* cited by examiner

Primary Examiner—Eric K. Nicholson
Assistant Examiner—James M. Hewitt
(74) Attorney, Agent, or Firm—McCormick, Paulding & Huber LLP

(57) ABSTRACT

A device for coupling pipelines for running cryogenic liquid has: a pair of flanges which are pierced by coupling units respectively and which support the coupling units with the coupling units freely approaching and separating from each other and which form compartments around the coupling units; a pair of inner cover units which open and shut the insides of the coupling units; a pair of outer cover units which open and shut the insides of the compartments of the flanges; and purge lines for purging the insides of the compartments. The process of coupling pipelines by this device has the steps of: opening the outer cover units with the insides of the coupling units shut by the inner cover units; coupling the flanges to each other; purging the inside of a compartment which is formed in the flanges; opening the inner cover units; and coupling the coupling units to each other with the coupling units isolated from the outside air. It can be possible to promptly perform the separation and the coupling of the pipelines with high purity kept. Moreover, the reduction of the cost of the separation and the coupling can be accomplished because the quantity of flushing fluid can be reduced greatly.

18 Claims, 4 Drawing Sheets

DEVICE FOR COUPLING PIPELINES FOR RUNNING CRYOGENIC LIQUID

CROSS REFERENCE TO RELATED APPLICATION

The basis of the priority right of the present application is Japanese Patent Application No. 2000-194929 (filing date: Jun. 23, 2000), and the contents of the above-mentioned Japanese application are deemed to be incorporated in the present specification.

BACKGROUND OF THE INVENTION

1. Field of the Invention

The present invention relates to pipelines for running cryogenic (very-low-temperature) liquid such as liquid oxygen, liquid hydrogen and the like which is used for rocket fuel and relates more particularly to a device for coupling and separating coupling (jointer) units of the pipelines.

2. Description of the Related Art

A bayonet coupling (jointer) by which coupling and separation can be easily and reliably carried out has been often adopted for the pipelines in which cryogenic liquid f lows. However, when this bayonet coupling is used, the inside bayonet couplings are coupled to or separated from each other, in order to keep the insides of the pipelines clean, after surroundings of the coupling units are covered with vinyl or plastic or the like, or after a ball valve is installed and the valve is opened or closed.

In other words, if the insides of the pipelines are exposed to the open air when the coupling or the separation of the bayonet coupling units is performed, dust and moisture in the air can intrude into the insides of the pipelines. As a result, the insides of the pipelines are polluted or the condensation of the moisture is left in the insides of the pipelines, and this can cause the deterioration of the purity of the cryogenic liquid. Accordingly, a method to prevent the pollution when the coupling or the separation is carried out and to keep the purity as high as possible is adopted. Specifically, when liquid flowing in the pipelines is cryogenic liquid which is used for rocket fuel such as liquid oxygen, liquid hydrogen or the like, it is required that the degree of the purity be kept to be in an extremely high level, in order to keep the insides of the pipelines clean.

By the way, in a method by which the surroundings of the coupling units are covered with vinyl or plastic in order to maintain the purity of the insides of the pipelines, it is impossible to promptly carry out the coupling or the separation of the coupling units, because every time the operation of coupling or separation is carried out it is necessary to put on and take off vinyl or plastic. Moreover, in this method it is extremely difficult to completely prevent the contamination, because when the separation is carried out the insides of the pipelines are exposed to the outside for a moment.

On the other hand, in another method by which a ball valve or the like is installed around the coupling units, there is also fear that the purity of the insides of the pipelines deteriorates by the intrusion of dust and by a dew-point rise, because the insides contact with the outside air even though the insides contact with the outside air only for a minute when the ball valve is opened and closed.

There is another technique (see Japanese Patent Application, Laid Open Publication No. 64-40786), wherein the surroundings of the coupling units are covered with a box and then helium gas is provided into the box and thereby freezing of the coupling units is prevented when cryogenic oxygen or the like is poured or discharged. However, even by this technique, when the coupling units are separated from each other, it is impossible to avoid the inside pollution because the insides of the pipelines become open to the outside momentarily.

Therefore, conventionally after coupling or separation, the insides of the pipelines have been purged by using clean nitrogen gas having prescribed purity and a prescribed dew point. Thereby, the purity of the pipelines becomes higher and a dew point drops. However, it takes a considerable time to depress a dew point to a prescribed value and also it takes a certain time to carry out the purity analysis and the dew point analysis as well. Therefore, it has been difficult to carry out the quick coupling and the quick separation of the coupling units.

SUMARRY OF THE INVENTION

It is one object of the present invention to provide a device for coupling pipelines in which cryogenic liquid flows, wherein both coupling units are reliably separated from and coupled to each other without polluting the insides of the pipelines by the inflow of dust or moisture in the open air and with the inside kept highly clean.

It is another object of the present invention to provide a device for coupling pipelines in which cryogenic liquid flows, wherein both coupling units can be promptly coupled to and separated from each other.

It is another object of the present invention to provide a device for coupling pipelines in which cryogenic liquid flows, wherein positioning the pipelines (align the axes of the pipelines with each other) can be easily and reliably carried out when coupling is performed.

In order to achieve these purposes, the present invention provides a coupling device, wherein one of the coupling units is confronted with the other of the coupling units for carrying out separation and coupling, and wherein this coupling device comprises: a pair of flanges which are pierced by the coupling units to support the coupling units with the coupling units moving close to or away from each other at will and which form compartments (i.e., rooms which can be isolated from the open air) around the coupling units; a pair of inner cover units which open or close the surfaces at the ends of the coupling units; a pair of outer cover units which open or shut the compartments of both flanges; and purge lines which purge the insides of the compartments.

That is, in the present invention, firstly the inner cover units which open or close the coupling units are provided on this device. When separation is carried out, it is possible to cut off contact with the outside air by shutting the insides of the pipelines with the inner cover units. Therefore, the pollution in the pipelines by the inflow of dust and moisture can be prevented. Secondly, the flanges which support the coupling units with the coupling units freely approaching and separating from each other are installed on both coupling units, and the compartments of the flanges are opened and closed by the outer cover units. Thereby, it is possible to isolate the compartments of the flanges from the outside air. Thirdly, the purge lines are provided on the flanges having these compartments. Thereby, the insides of the compartments can be purged by using clean purge gas. It is thus possible to joint and separate both coupling units without the pollution by the inflow of dust or moisture from the open air when the inner cover units are opened.

As a result, it becomes possible to securely carry out the separation and the coupling of the coupling units with the insides of the coupling units kept highly pure. Moreover, it becomes possible to take less time to depress a dew point (the dew-point depression is carried out after separation and connection) and it becomes unnecessary to carry out the dew-point analysis as well as the purity analysis. Accordingly, it becomes possible to perform quick connection and quick separation.

Furthermore, one of the flanges is made to have insertion pins for positioning and the other of the flanges is made to have insertion holes into which the insertion pins are inserted. By using the insertion pins and the insertion holes, positioning the pipelines (aligning the axes of the pipelines) can be easily and reliably carried out particularly when coupling is carried out.

DETAILED DESCRIPTION OF THE INVENTION

The description of a preferred embodiment of the present invention with reference to the drawings is as follows.

Figure 1:
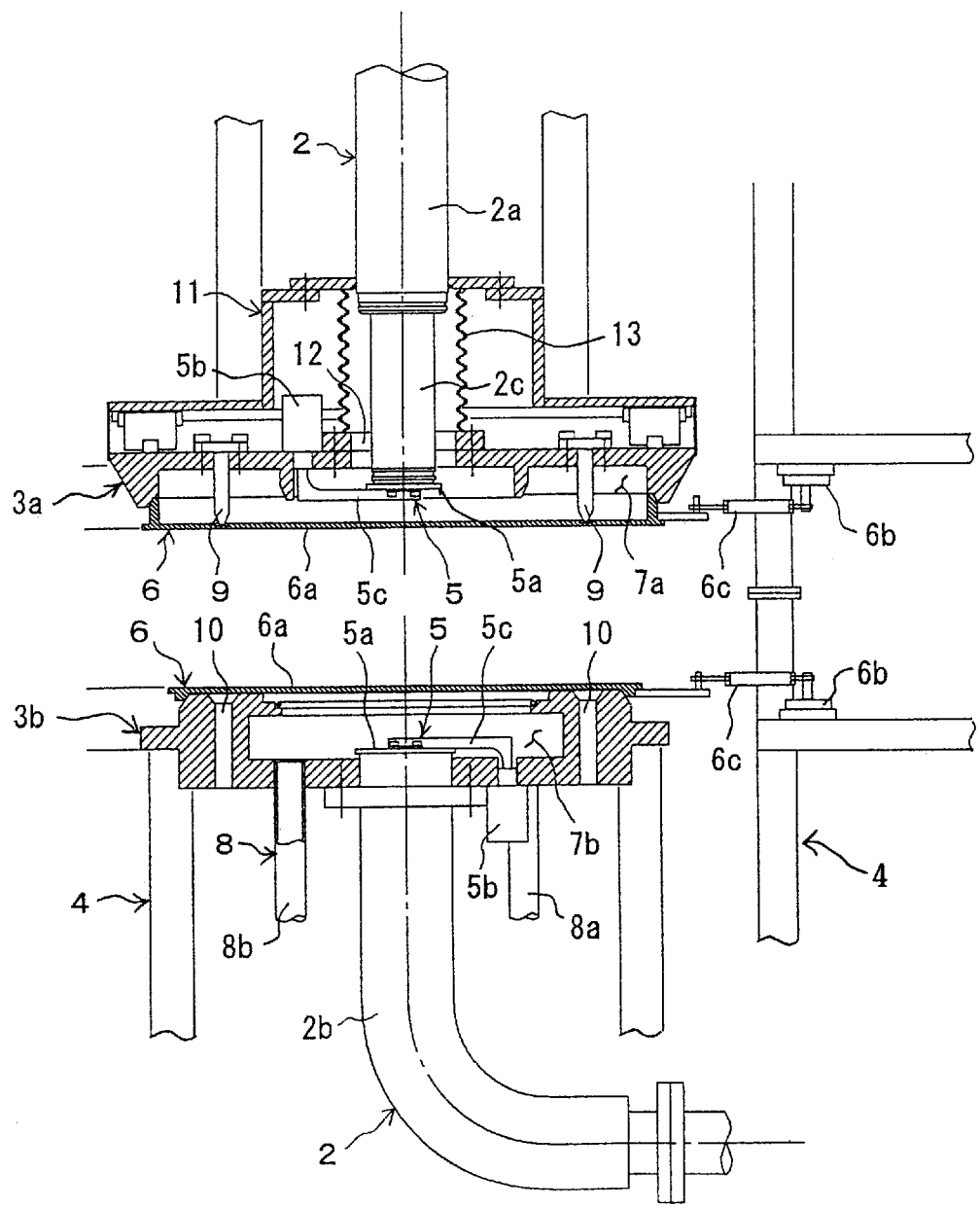
FIG. 1 is a schematic drawing of longitudinal section of one embodiment of the device for coupling pipelines for running cryogenic liquid according to the present invention.

FIG. 1 shows one embodiment of the device for coupling pipelines for running cryogenic liquid of the present invention. Reference number 2a in FIG. 1 designates a male coupling unit which has one of bayonet coupling units of the pipeline 2 for running cryogenic liquid. Reference number 2b in FIG. 1 designates a female coupling unit into which the bayonet unit 2c of the male coupling unit is inserted to perform coupling. As shown in FIG. 1, discoid flanges 3a and 3b whose longitudinal sections are U-shaped are above and below and face-to-face established on the male coupling unit 2a and the female coupling unit 2b respectively. The centers of these flanges 3a and 3b are pierced by and support the male coupling unit 2a and female coupling unit 2b respectively.

Moreover, as for these flanges 3a and 3b, one flange 3a which supports the male coupling unit is supported by and connected to an elevator machinery (not shown), and thereby is made to freely move upwards or downwards, approaching and moving away from the other (downward) flange 3b which is supported and fixed by frames 4.

The inner cover units 5 and 5 are disposed on or on near the centers of the flanges 3a and 3b, and the insides of the male coupling unit 2a and the female coupling unit 2b are opened and shut by the inner cover units 5 and 5 respectively. The inner cover unit 5 is the unit which has a discoid cover member 5a and a revolution motor 5b having a rotation shaft, the discoid cover member 5a and the rotation shaft of the revolution motor 5b are connected to each other by a dogleg arm 5c. The cover units 5a and 5a are positioned to be able to slide and abut on end surfaces of the coupling units 2a and 2b respectively, and the revolution motors 5b and 5b are disposed on flanges 3a and 3b respectively. The cover units 5a and 5a can be slided in the direction of the radii of end surfaces of the coupling units 2a and 2b along the end surface by rotating the rotation shafts of the revolution motors. It is thereby possible to open and close the end surface of each coupling unit 2a and 2b.

Meanwhile, the outer cover units 6 and 6 are established on the flanges 3a and 3b respectively. The flanges 3a and 3b whose section are U-shaped are divided to form the compartments 7a and 7b therein respectively. By these outer cover units, the insides of these compartments are exposed to and isolated from the outside air at will. The outer cover unit 6 is the unit which has a discoid and rimmed cover unit 6a and sliding elevator machinery 6b, both of which are connected to each other by a connection member 6c. The outer cover units 6a and 6a has the approximately same radii as the radii of the compartment 7a and 7b respectively in the flange 3a and 3b respectively. This sliding elevator machinery 6b is established on the frame 4 which is situated near the cover member 6a. By means of this sliding elevator machinery 6b, the cover member 6a is made to move upwards or downwards, approaching or separating from flange 3a and 3b and also the cover member 6a is made to slide in the direction of the radius of the cover member 6a to open and close the compartment 7a and 7b in the flange 3a and 3b respectively.

Moreover, the purge line 8 which has a purge pipe 8a and an exhaust pipe 8b is connected to the compartment 7b of the flange 3b on the female coupling unit 2b. Thereby, the inside of the compartment 7b can be purged by the purge gas. Furthermore, a similar purge line (not shown) is connected to the flange 3a. By using the purge line of the flange 3a the inside of the compartment 7a can be purged at will.

Moreover, as shown in FIG. 1, a plurality of insertion pins 9 which have pointed ends and face the flange 3b are installed on one flange 3a on the male coupling 2a. When both flanges 3a and 3b are made to approach each other for coupling, these insertion pins 9 are inserted into the insertion holes 10 which are formed on the other flange 3b. Thereby, positioning can be correctly and easily accomplished.

Furthermore, in order to perform coupling and separation, the male coupling unit 2a also can freely rise and fall to and away from the flange 3a by an elevator means (not shown). Therefore, instead of installing the male coupling unit 2a directly on the flange 3a, the male coupling unit 2a is supported indirectly by the flange 3a through machinery 11 for aligning the axes of the both coupling units which is established on the upper surface of the flange 3a. Accordingly, a penetration hole 12 whose radius is larger than the radius of the bayonet coupling unit 2c of the male coupling unit is formed at the center of the flange 3a. As a result, an annular space is produced. However, the compartment 7a in the flange 3a does not become exposed to the upside of the flange 3a because the surroundings of the penetration hole 12 is covered with metal bellows 13.

Next, the operation of the coupling device of the present invention which has such structure is described as follows.

Figure 2:
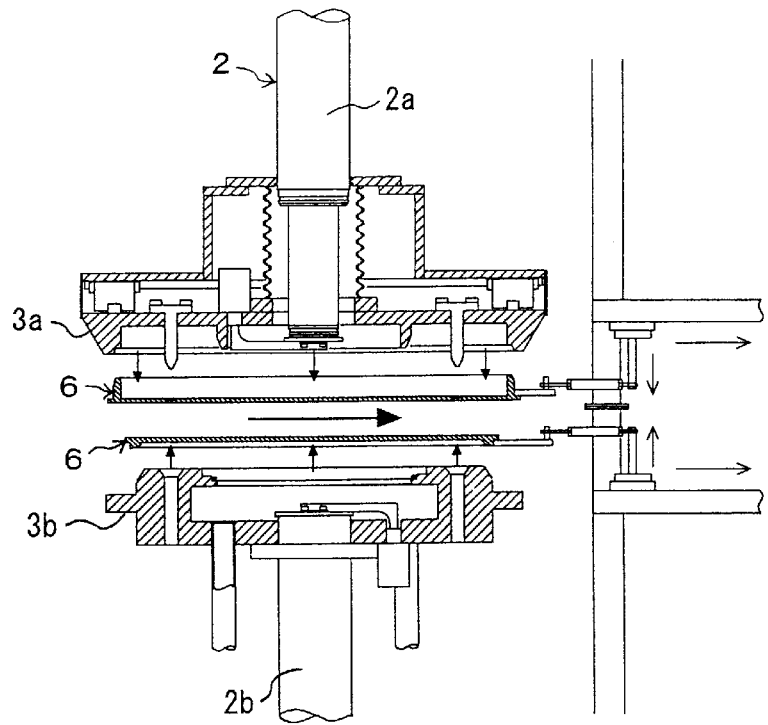
FIG. 2 is a view similar to that of FIG. 1 and shows the coupling device with outer cover units removed.
Figure 3:
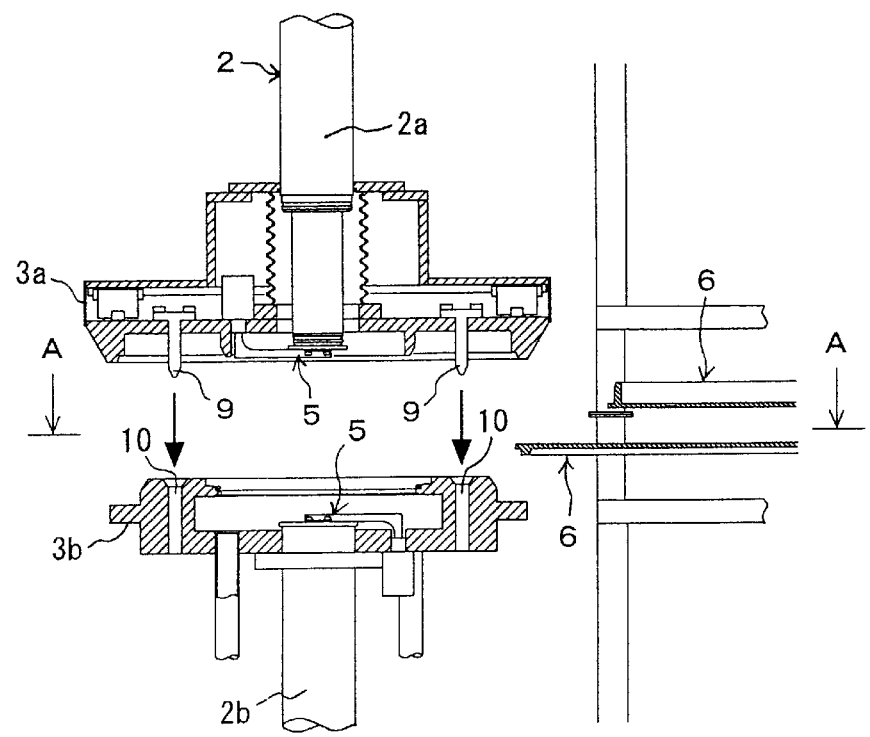
FIG. 3 is a view similar to that of FIG. 2 and shows the coupling device with both flanges approaching each other after the outer cover units are made to slide.
Figure 4:
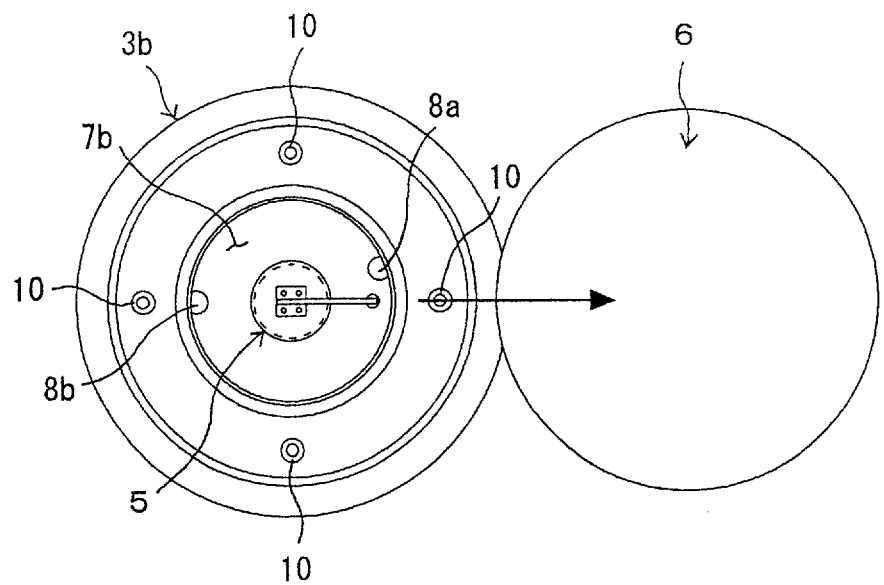
FIG. 4 is a view taken in the direction of the arrow A of FIG. 3.
Figure 5:
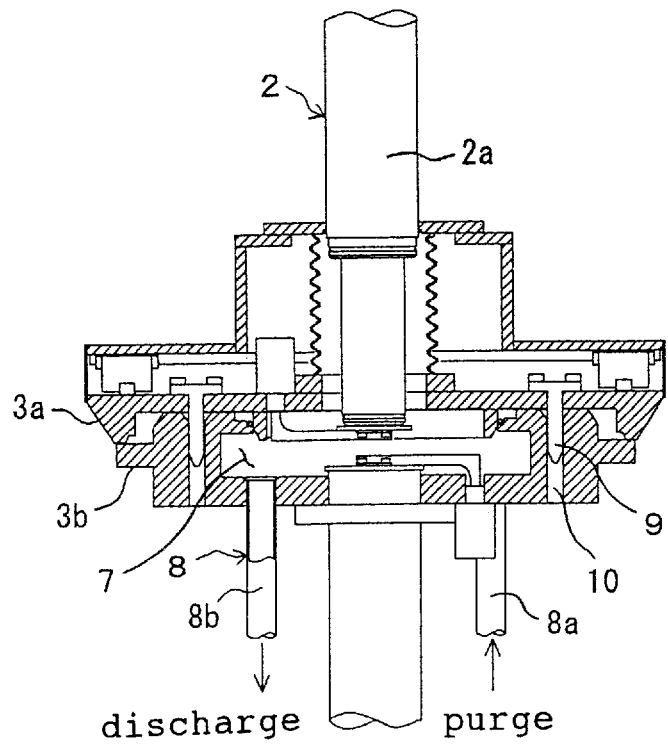
FIG. 5 is a view similar to that of FIG. 3 and shows the coupling device with both flange coupled to each other after both flanges approach each other.

As the first step to couple both coupling units 2a and 2b from the state in which the male coupling unit 2a and the female coupling unit 2b are above and below separated from each other, the cover units 6a and 6a which shut the compartments 7a and 7b respectively in the flange 3a and 3b respectively are removed to make the compartments 7a and 7b open, as shown in FIGS. 2, 3 and 4. The upper flange 3a, together with the male coupling unit 2a, is then made to descend to combine the flange 3a with the flange 3b. Thereby, as shown in FIG. 5, the compartment 7a and 7b are combined with each other to form one shut large compartment 7 between the flange 3a and 3b. At this moment the open air flows into the compartment 7a and 7b, but there is no fear that the male coupling unit 2a and the female coupling unit 2b are polluted by the inflow of dust and moisture in the air because the male coupling unit 2a and the female coupling unit 2b are shut by the inner cover units 5 and 5 respectively. Moreover, as described hereinabove, the insertion pins 9 for positioning the pipelines which have pointed ends are established on the upper flange 3a. The ends of these insertion pins 9 are made to face the insertion holes 10 which are formed at the lower flange 3b, and are inserted into the insertion holes 10 respectively. Thereby, both flanges 3a and 3b can be readily and accurately coupled to each other even if the positions of both flanges 3a and 3b are somewhat dislocated before coupling is completed.

Figure 6:
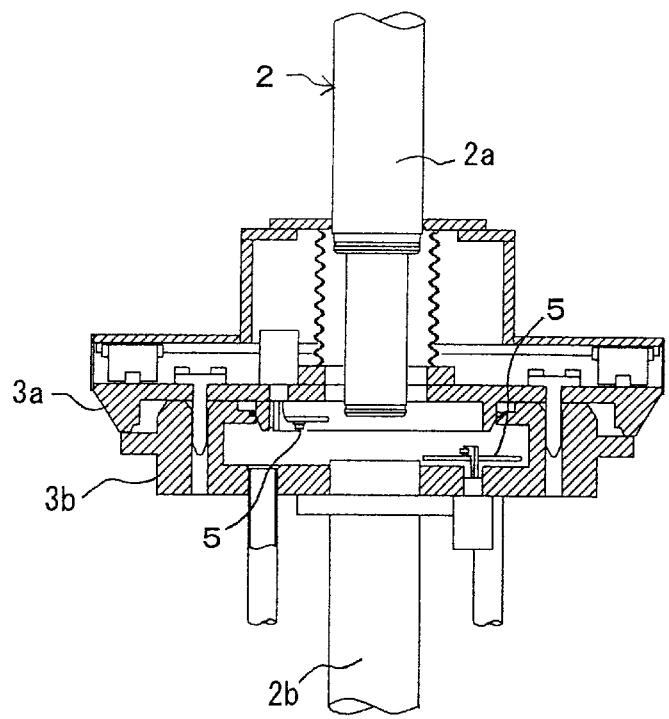
FIG. 6 is a view similar to that of FIG. 5 and shows the coupling device with the inner cover units removed from the end surfaces of the coupling units.
Figure 7:
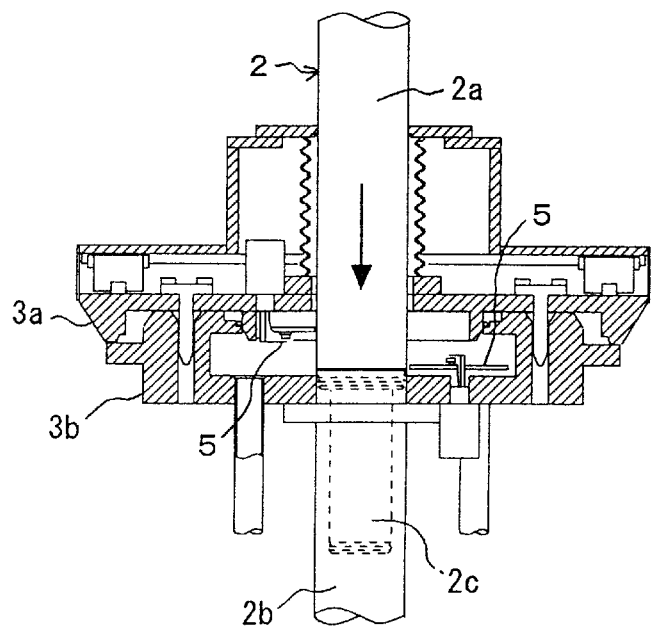
FIG. 7 is a view similar to that of FIG. 6 and shows the coupling device with the male coupling unit coupled to the female coupling unit after the male coupling unit alone is made to descend.

Secondly, if coupling is accomplished, the purge line 8 is then opened and the inside of the compartment 7 is purged by the inflow of pure purge gas such as nitrogen gas and the like into the compartment 7 through the purge pipe 8a, as shown in FIG. 5. As shown in FIG. 6, the insides of the male coupling unit 2a and the female coupling unit 2b are then opened by operating the inner cover units 5 and 5. At this moment, there is no fear that the insides of the male coupling unit 2a and the female coupling unit 2b are polluted by the inflow of dust and moisture in the air, because the surroundings of the male coupling unit and female coupling unit (i.e., the inside of the compartment 7) have already been filled with the clean purge gas. As shown in FIG. 7, by means of a elevator mechanism (not shown) the upper male coupling unit 2a alone is then made to descend to put the bayonet coupling unit 2c into the female coupling unit 2b. Thereby the male coupling unit 2a and the female coupling unit 2b can be coupled with the insides kept highly pure. If coupling is accomplished like this, flushing fluid is flushed into the pipelines in order to perform flushing. However, the main purpose of flushing the pipelines is only to depress a dew point because the insides of the pipelines are not polluted at all as described hereinabove. Therefore, the quantity of the flushing fluid can be cut down greatly and can be much smaller than the conventional quantity.

Next, in order to completely separate both coupling units 2a and 2b from this coupling state, the reverse process of the above-mentioned operational process is carried out. That is, the male coupling unit 2a alone is made to rise and both coupling units 2a and 2b are separated from each other. Then, the insides of the male coupling unit 2a and the female coupling unit 2b are shut by operating the inner cover units 5 and 5 respectively, and the flange 3a is made to rise to separate the flange 3a from the flange 3b. These flanges 3a and 3b are then covered with the outer cover units 6 and 6 respectively. Thereby, both flanges 3a and 3b can be separated completely. Moreover, the insides of the compartments 7a and 7b are purged with these compartments 7a and 7b covered with the outer cover units 6 and 6. By purging like this, it becomes possible to more reliably prevent each inside of the compartments 7a and 7b from being polluted during the state in which the compartments 7a and 7b are waiting for coupling after separation.

Thus the coupling device of the present invention makes it possible to securely prevent the pollution of the coupling units of pipelines for running cryogenic liquid when separation or coupling is performed and makes it possible to maintain excellent purity because during the separation state the coupling units 2a and 2b are covered with the inner cover units 5 and 5, and moreover the surroundings of both coupling units are isolated from the open air by the outer cover units 6 and 6.

Consequently, it becomes unnecessary to perform such a troublesome process as putting on and taking off vinyl or plastic and the like as usual, and the separation and the coupling of the coupling units can be promptly carried out. Moreover, flushing fluid to use can be decreased in quantity, and the time and the cost which are required can be cut back greatly because the pollution of the insides of the pipelines can be more reliably prevented in this device than in adopting a ball valve or the like. Furthermore, it can take less time to perform flushing for depressing a dew point, because a rise in temperature at the coupling units and the insides of the coupling units can be restrained by isolating the coupling units and the insides of the coupling units from the air after separation.

What is claimed is:

1. A device for coupling pipelines for running cryogenic liquid, wherein a first coupling unit is made to confront a second coupling unit, to carry out coupling and separation, and wherein the device comprises:

a pair of flanges which are pierced by the coupling units respectively and which support the coupling units respectively when the coupling units are being joined or separated from each other and which form compartments respectively around the coupling units;

a pair of inner cover units which open and shut respective end surfaces of the coupling units;

a pair of outer cover units which open and shut respective interiors of the compartments; and purge lines for purging the interior of the compartments.

2. The device for coupling pipelines for running cryogenic liquid according to claim 1, wherein one of the coupling units is a male coupling unit which includes one bayonet coupling unit, and wherein the other of the coupling units is a female coupling unit which includes another (a mating) bayonet coupling unit.

3. The device for coupling pipelines for running cryogenic liquid according to claim 2, wherein a mechanism for aligning longitudinal axes of the coupling units is disposed on the flange of the male coupling unit and the flange of the male coupling unit indirectly supports the male coupling unit through the mechanism, and wherein a penetration hole is formed at the center of the flange of the male coupling unit and the radius of the penetration hole is larger than the radius of the bayonet coupling unit of the male coupling unit and the bayonet coupling unit of the male coupling unit passes along the penetration hole when coupling and separation are carried out, and wherein metal bellows which cover the surroundings of the penetration hole are installed on the device.

4. The device for coupling pipelines for running cryogenic liquid according to claim 1, wherein insertion pins for positioning the pipelines are provided on one of the flanges and insertion holes into which the insertion pins are inserted are provided on the other of the flanges.

5. The device for coupling pipelines for running cryogenic liquid according to claim 1, wherein one of the coupling units freely moves relative to the flange which supports this coupling unit.

6. The device for coupling pipelines for running cryogenic liquid according to claim 1, wherein each inner cover unit comprises:

a discoidal cover member which freely slides relative to the end surface of the coupling unit in the direction of the radius of the end surface of the coupling unit;

a revolution motor which is installed on the flange; and an arm which connects the rotation shaft of the revolution motor to the discoidal cover member.

7. The device for coupling pipelines for running cryogenic liquid according to claim 1, wherein each outer cover unit comprises:

a discoidal and rimmed cover member whose radius is almost the same as the radius of the compartment of the flange;

a sliding elevator mechanism f or making the discoidal and rimmed cover member move upwards and downwards and slide in the direction of the radius of the discoidal and rimmed cover member relative to the flange; and a connection member which connects the sliding elevator mechanism to the discoidal and rimmed cover member.

8. The device for coupling pipelines for running cryogenic liquid according to claim 1, wherein the purge lines comprise:

purge pipes which send purge gas to the interiors of the compartments of the flanges; and exhaust pipes which exhaust gas in the interiors of the compartments.

9. A device for coupling pipelines for running cryogenic liquid, wherein a first coupling unit is made to confront a second coupling unit, to carry out separation and coupling, and wherein the device comprises:

a pair of flange means which are pierced by the coupling units respectively and which support the coupling units respectively when the coupling units are being joined or separated from each other and which form compartments respectively around the coupling units;

inner cover means for opening and shutting respective end surfaces of the coupling units;

outer cover means for opening and shutting the respective interiors of the compartments;

purge means for purging the interior of the compartments.

10. The device for coupling pipelines for running cryogenic liquid according to claim 9, wherein one of the coupling units is a male coupling unit which includes one bayonet coupling unit, and wherein the other of the coupling units is a female coupling unit which includes another (a mating) bayonet coupling unit.

11. The device for coupling pipelines for running cryogenic liquid according to claim 9, wherein insertion pins for positioning the pipelines are provided on one of the flanges and insertion holes into which the insertion pins are inserted are provided on the other of the flanges.

12. The device for coupling pipelines for running cryogenic liquid according to claim 9, wherein one of the coupling units freely moves relative to the flange which supports this coupling unit.

13. The device for coupling pipelines for running cryogenic liquid according to claim 9, wherein the inner cover means comprises:

a discoidal cover member which freely slides relative to the end surface of the coupling unit in the direction of the radius of the end surface of the coupling unit;

a revolution motor which is installed on the flange;

an arm which connects the rotation shaft of the revolution motor to the discoidal cover member.

14. The device for coupling pipelines for running cryogenic liquid according to claim 9, wherein the outer cover means comprises:

a discoidal and rimmed cover member whose radius is almost the same as the radius of the compartment of the flange;

a sliding elevator mechanism for making the discoidal and rimmed cover member move upwards and downwards and slide in the direction of the radius of the discoidal and rimmed cover member relative to the flange;

a connection member which connects the sliding elevator mechanism to the discoidal and rimmed cover member.

15. The device for coupling pipelines for running cryogenic liquid according to claim 9, wherein the purge means comprise:

a purge pipe which sends purge gas to the interior of the compartment of the flange;

an exhaust pipe which exhausts the gas of the interior of the compartment of the flange.

16. A process for coupling pipelines for running cryogenic liquid, using the device of claim 1, comprising the steps of:

shutting the inside of each of the coupling units by each of the inner cover units;

opening each of the outer cover units;

making the flanges approach each other to couple the flanges and making the compartments coupled to each other to form one shut compartment;

purging the interior of the one shut compartment to make the interior of the one shut compartment clean;

opening each of the inner cover units; and confronting the coupling units with each other to couple the coupling units to each other.

17. The process for coupling pipelines for running cryogenic liquid according to claim 16, wherein when the flanges are made to approach each other in order to couple one of the flanges to the other of the flanges, insertion pins of one of the flanges are inserted into insertion holes of the other of the flanges to couple the flanges to each other.

18. A process for separating pipelines from the coupling state according to claim 16, comprising the steps of:

separating one of coupling units from the other of the coupling units;

shutting the inside of each of the coupling units by each of the inner cover units;

separating one of the flanges from the other of the flanges;

shutting the inside of each of the flanges by each of the outer cover units; and purging the interior of the compartment of each of the flanges.

* * * * *